April 14, 1936.  M. R. FENSKE ET AL  2,037,318
PROCESS AND APPARATUS FOR TREATING MINERAL OILS
Filed March 13, 1935  6 Sheets-Sheet 1

Inventors
Merrell R. Fenske
and Wilbert B. McCluer
By Hugo A. Kenman
Attorney

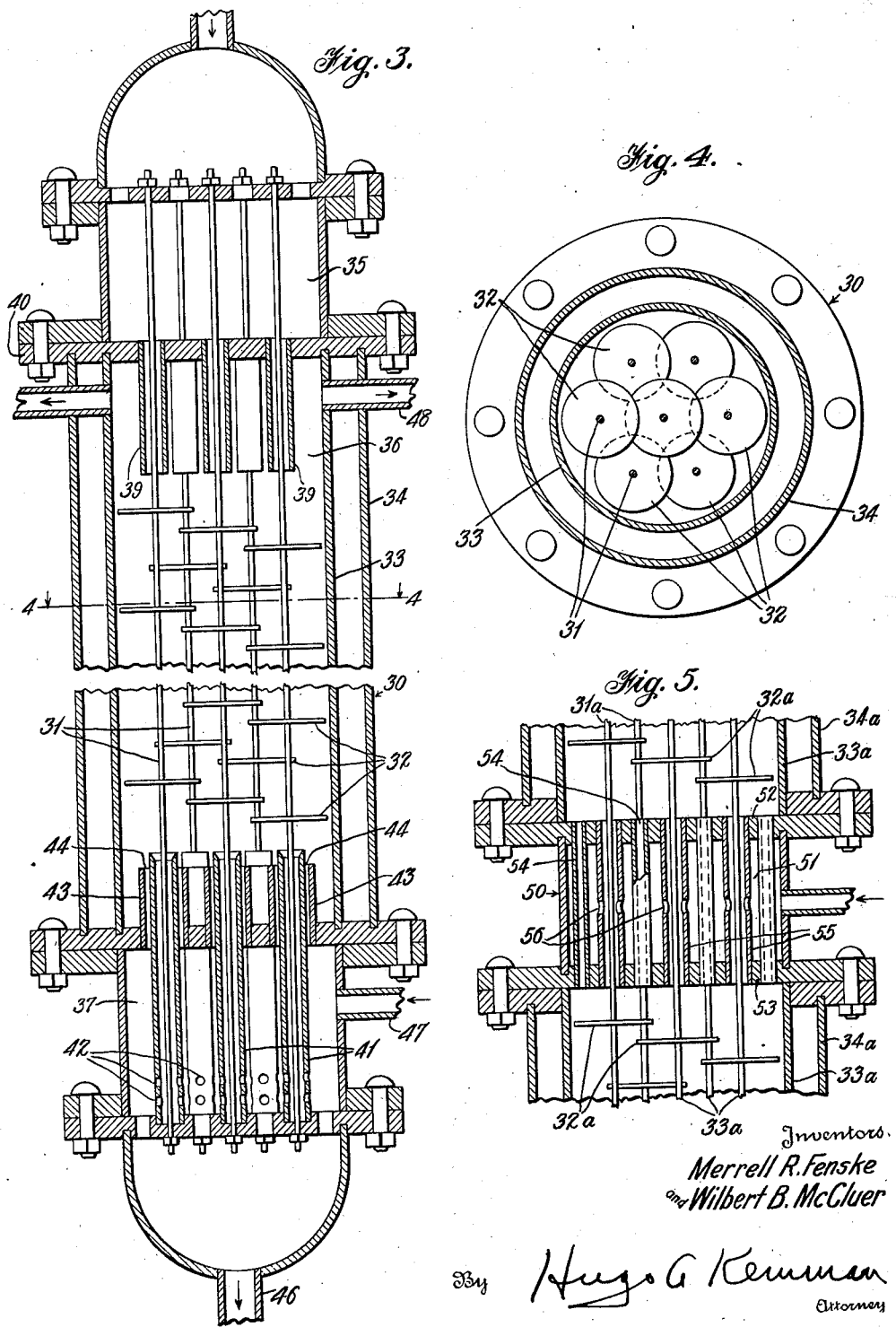

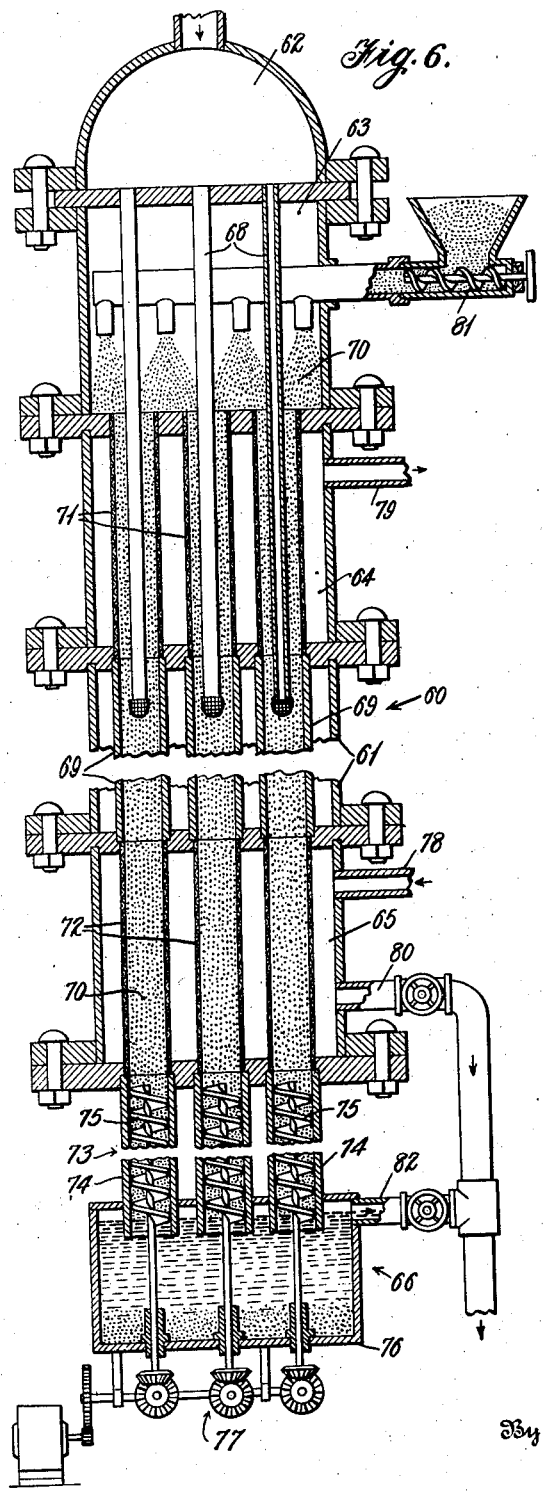

April 14, 1936.   M. R. FENSKE ET AL   2,037,318
PROCESS AND APPARATUS FOR TREATING MINERAL OILS
Filed March 13, 1935   6 Sheets-Sheet 5
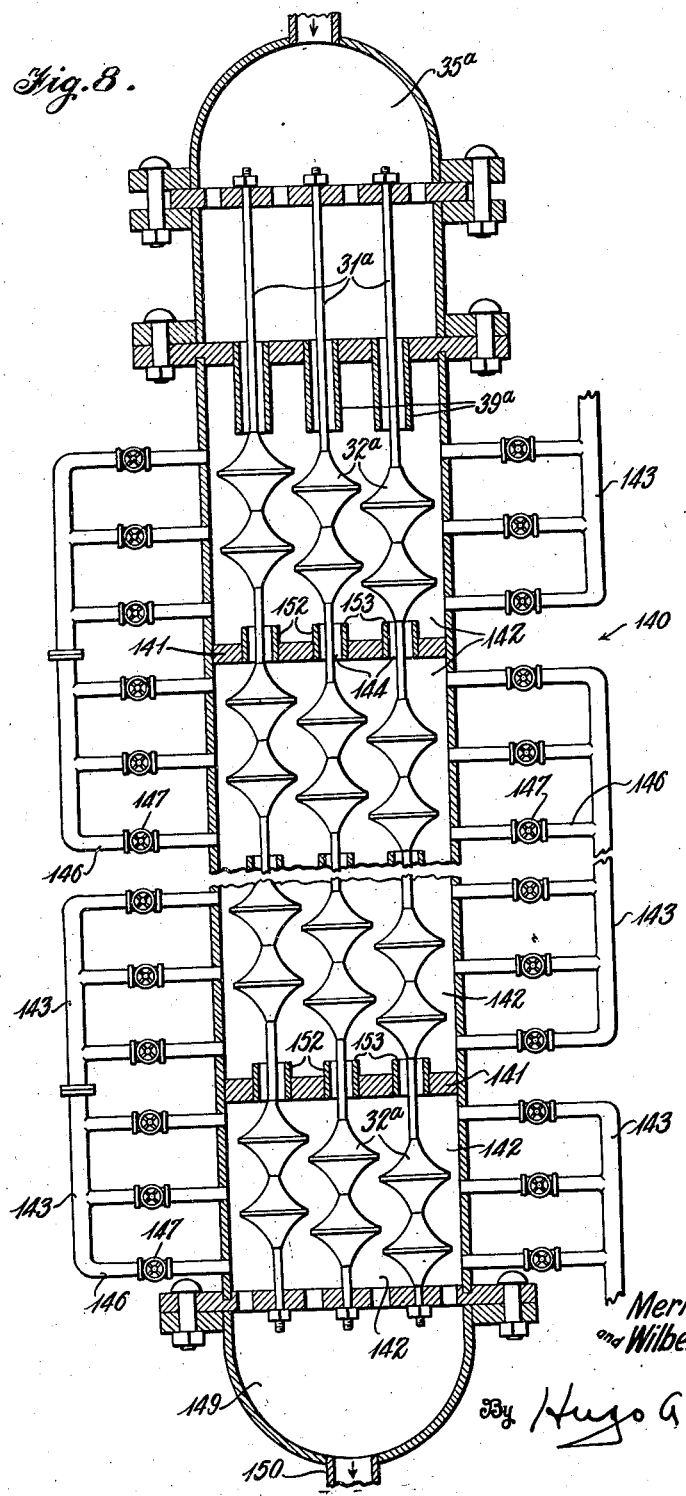

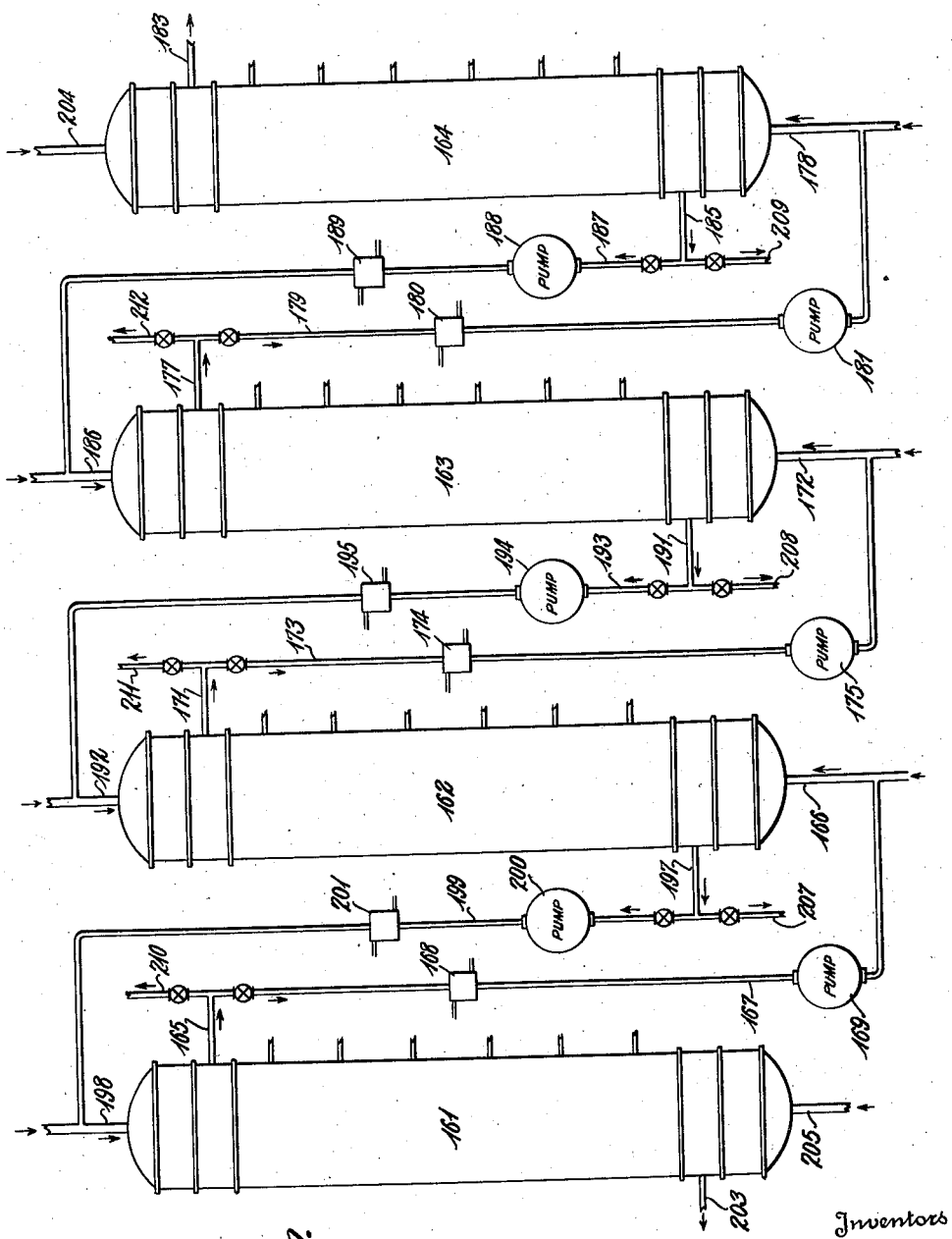

Patented Apr. 14, 1936

2,037,318

UNITED STATES PATENT OFFICE 2,037,318

PROCESS AND APPARATUS FOR TREATING MINERAL OILS

Merrell R. Fenske and Wilbert B. McCluer, State College, Pa., assignors to Pennsylvania Petroleum Research Corporation, a corporation of Pennsylvania Application March 13, 1935, Serial No. 10,932

24 Claims. (Cl. 196—13)

This invention pertains generally to a method and apparatus for contacting liquid phases.

The invention pertains more particularly to a method and apparatus of the foregoing character wherein high efficiencies are obtained by effectively contacting the liquid phases without serious channeling. This is accomplished generally speaking by causing the liquids to flow through the zone of contact over longitudinally arranged attenuated packing members.

While in the following description reference will be made to the contacting of lubricating oil with solvent, it is to be understood that the process and apparatus may be employed for contacting other liquids.

The flow of the liquid phases during contact will be referred to as being countercurrent. This term, however, in certain specific instances is subjected to a broad interpretation as will appear hereinafter in the description of such instances.

The longitudinally arranged attenuated packing members may or may not be separately enclosed.

When they are of the same dimensions and are not separately enclosed to form separate paths for the countercurrently flowing liquids, said packing members are usually substantially equally distributed laterally of the counterflow, and substantially the same amount of liquid is caused to flow over each. Thus substantially the same conditions are caused to exist throughout any lateral cross section of the counterflow when the process is in operation. Should the packing members be of different dimensions, the necessary adjustments as to distribution of packing members and/or of liquid flow may be made to accomplish the same results.

When the longitudinally arranged packing members are separately enclosed, for instance, by tubes having relatively small cross sections of any desired geometrical shape, the countercurrently flowing liquids are brought into efficient contact in a plurality of separate groups of countercurrently flowing streams or, in other words, in a plurality of separate phase contacting units. In this case each liquid is preferably metered into each unit in a manner so that at least substantially the same results are produced by each unit.

The countercurrently flowing streams may comprise solvent and oil in which case the heavier of the two liquids will usually be introduced into the tower at the top thereof and the lighter at the bottom.

The counterflow, however, may be comprised of two or more immiscible or only partially miscible solvents of different densities in which case the oil may be introduced into the tower at a point or points intermediate the counterflow.

The counterflow may also comprise oil flowing in one direction and a plurality of solvents introduced at different points along the tower flowing in the other direction.

The counterflow may also comprise other combinations as well as other liquids, examples of which will hereinafter appear.

It has been observed that wetting of the longitudinally arranged packing members by one and perhaps in some cases two or more phases plays an important part in the efficiency of contact and the prevention of channeling. These longitudinally arranged attenuated packing members appear to act as guiding elements for at least one phase (and possibly) as it flows through the tower keeping said phase distributed laterally of its flow. The attenuations are preferably of sufficiently small cross section to avoid presenting a path of least resistance of any practicable consequence upon (which terms include through) itself.

The wetting feature makes it possible to disperse the wetting phase (or phases) by virtue of its spreading out into films on the surface of the packing member or members. It has been observed that these films in some cases collect in drops at points on the packing and become detached only to recontact the packing and spread out into films again. This kneading action when present assists in bringing the phase particles to the surface for contact purposes.

While the capacity of a tower having longitudinally arranged attenuated packing members may be increased somewhat by increasing the cross sections of the packing members, to avoid serious channeling due to too large a cross section, the capacity preferably will be increased and decreased by increasing and decreasing the number of packing members. The periphery of the tower will then be adjusted to conform thereto.

Thus the attenuated packing members may have any other construction or surface configuration suitable for phase contact in the manner described herein including combinations of the foregoing and from the description it can be seen that when a phase flows over or about an attenuated packing member this may be over or about the exterior surfaces or the interior surfaces of the attentuated packing member or both.

When tubes are not employed the individual longitudinally arranged packing members may be of any suitable character, for instance, they may comprise rods of any geometrical cross section, strips of jack chain, etc. Such members may carry spaced laterally extending protuberances such as discs, spheres, frustums of cones, frustums of double cones, rain-drop shapes or any other surface of revolution to increase the surface. The protuberances on each attenuated packing member may overlap the protuberances on adjacent attenuated packing members so that any drops leaving any protuberances will at once contact another protuberance further downstream to reform into a film. This arrangement of the protuberances also causes the liquids to flow in a circuitous course through the tower.

When tubes enclose individual longitudinally arranged packing members, these members may be constructed as set forth in the preceding paragraph or they may be made up of a large number of separate elements such as raschig rings or similar packing. The separate elements may or may not be connected together since the packing member may acquire its shape by virtue of the tube wall.

Special types of packing are as follows:

1. Small wire forms such as single turn spirals, polyturn spirals, H shapes, S shapes, # shapes, open rings, ordinary carding teeth, bent carding teeth and similar forms, all having dimensions comparable to carding teeth used in the textile industry. These forms are found to be extraordinarily efficient, affording a high degree of surface area together with a high degree of free space.

2. Adsorbent material such as fuller's earth, silica gel, Florida earth, activated charcoal, and other filtering and contact refining agents which owe their action to what is called adsorption. These materials are preferably sufficiently coarse to afford sufficient free space for a practical rate of counterflow.

However, other types of packing may be employed, for instance, the tubes may be filled with jack chain.

The countercurrently flowing liquid phases may be engaged, that is contacted, continuously throughout the length of the counterflow or they may be disengaged, that is caused to assume a layer formation, at one or more points intermediate the ends of the counterflow. This alternate engagement and disengagement of phases combines in one continuous system the advantages of ordinary continuous countercurrent contact and the advantages of batch contact and particularly batch countercurrent contact.

The layer formation also permits the taking off of side streams.

Any side stream may be further treated, for instance, in continuous countercurrent for stripping purposes.

The contact between solvent and oil may be of the ordinary character wherein the solvent capacity of the solvent does not vary during the contact. However, it is particularly beneficial in this process because of the avoidance of serious channeling to set up reflux conditions in the tower. This may be accomplished by reducing the solvent capacity of the solvent in the direction of solvent flow, so that a part of that oil which dissolves in the solvent upon entry of the solvent into the tower is later thrown out of solution before the solvent leaves the tower. This precipitated oil will flow in the same direction as the original feed oil and will find its way back into the solution zone where at least a part will be redissolved and carried back into the precipitation zone. This cycle is continuously repeated. Thus, the border line materials between oil components of greater and lesser quality or of greater and lesser boiling point according to the solvent employed are repeatedly taken into solution and thrown out of solution and eventually a sharper separation is effected.

A reduction in solvent capacity in the direction of solvent flow may also be employed for fractional precipitation purposes. In this case a solvent-oil solution is flowed through a tower of the character herein described with the direction of solution flow such that the precipitate will flow countercurrently to the solution. The precipitate is thus scrubbed of its more soluble constituents during its flow through the tower as a separate phase, these constituents going into solution to replace less soluble constituents which are added to the precipitate. Because of the avoidance of serious channeling, unusually efficient results may be obtained.

Fractional precipitation may be repeated on the same solution as many times as desired, for instance, by flowing the solution serially through a plurality of towers thus accomplishing fractional precipitation in stages.

If the solvent-oil solution is brought to an unsaturated condition prior to or upon entry into the tower or towers, for instance, by heating the solution or adding more solvent, a solution zone will be set up in each tower through which the precipitate must pass. This causes a more effective scrubbing of the precipitate.

When a series of towers are employed for fractional precipitation in stages, a part of the precipitate separated from any one tower may be flowed countercurrently through another tower further upstream of solution flow along with the precipitate formed in said tower. The more soluble components of the former precipitate will go into solution to replace therein components of lesser solubility which are added to the latter precipitate. A part of the precipitate separated from each tower of a series, except, of course, the very first, may be fed back into the next preceding tower. Thus, all of the materials are more effectively scrubbed.

Reducing the solvent capacity of the solvent in the direction of solvent flow may be effected either by reducing the temperature of the solvent, by reducing the concentration of solvent such as by distillation or evaporation, or by adding another solvent which is capable of forming with the first solvent a solvent mixture of lower solvent capacity for the oil.

Further features of the invention reside in the construction, arrangement and combination of parts, and in the steps, combinations of steps, and sequences of steps, all of which, together with other features, will become more apparent to persons skilled in the art as the specification proceeds and upon reference to the drawings in which:

Figure 3 is a sectional elevation (shown broken) illustrating another form of the invention;

Figure 4 is a section on line 4—4 of Figure 3;

Figure 5 is a sectional elevation (shown broken)

Figure 7:
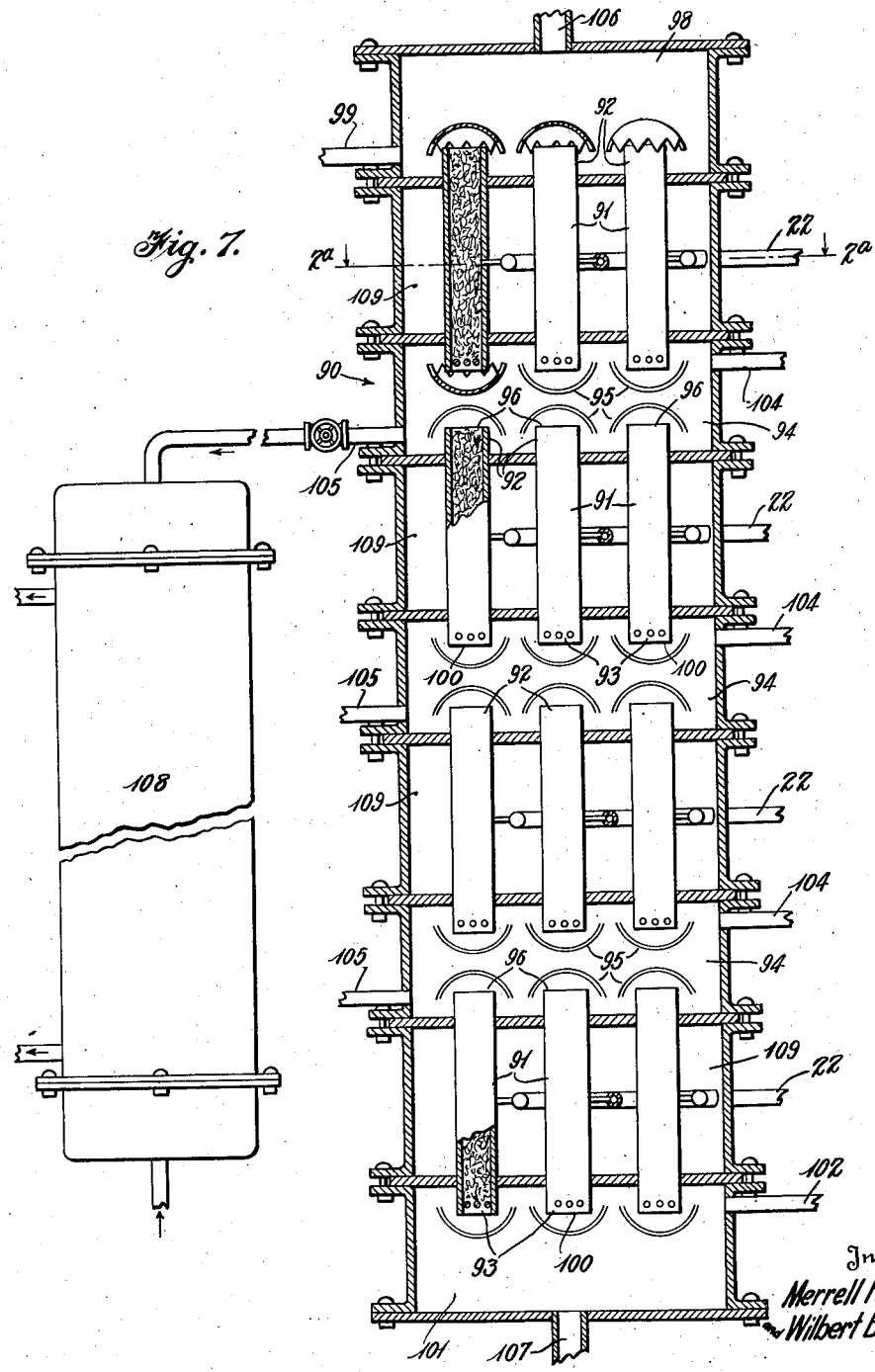

illustrating a modification of the form of the invention illustrated in Figures 3 and 4;

Figure 6 is a sectional elevation (shown broken) illustrating a further form of the invention;

Figure 7 is an elevation partly in section illustrating a still further form of the invention;

Figure 8 is a sectional elevation (shown broken) illustrating another form of the invention; and Figure 9 is an elevational view diagrammatically illustrating a manner of coupling a plurality of towers into a single system.

Figure 2:
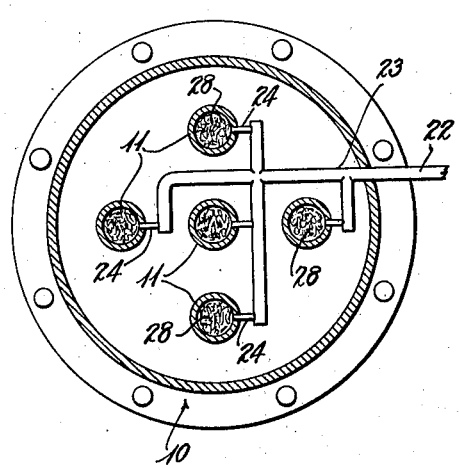
Figure 2 is a section on line 2—2 of Figure 1 or on line 2a—2a of Figure 7.
Figure 1:
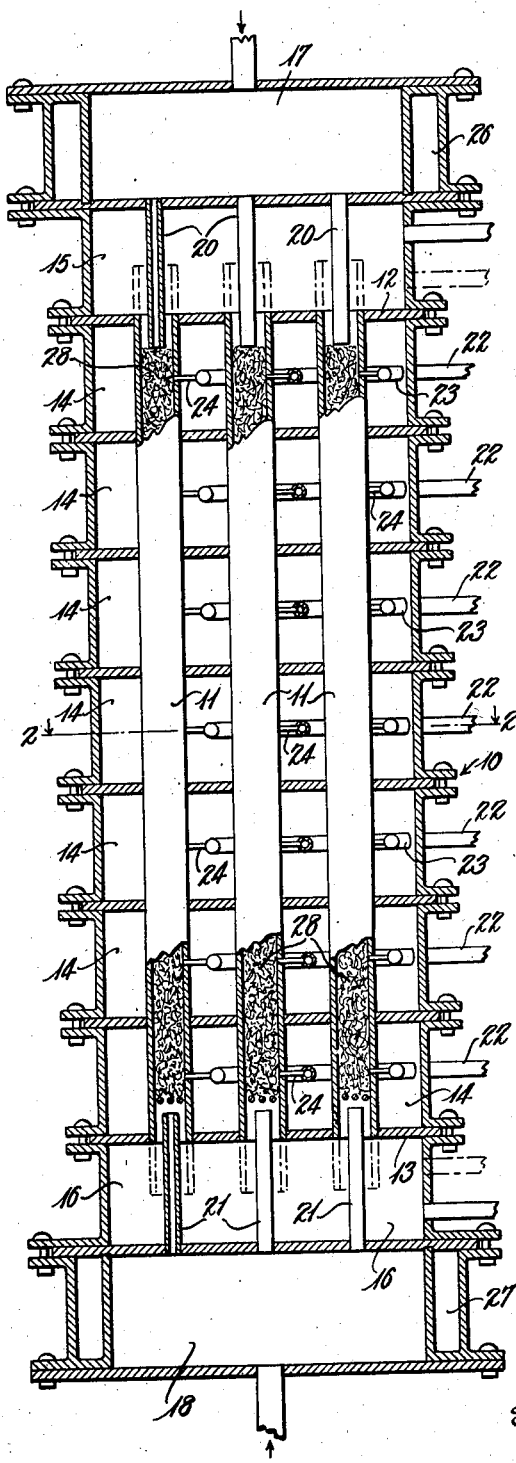
Figure 1 is a sectional elevation of a tower illustrating one form of the invention.

Referring now to Figures 1 and 2 at 10 is shown a tower comprising a plurality of tubes 11 joined at their ends by tube sheets 12 and 13 and surrounded by a plurality of superimposed chambers 14. Tower 10 also includes segregating chambers 15 and 16 respectively at opposite ends of tubes 11 as well as feeding chambers 17 and 18 also respectively at said opposite ends.

Liquid from chamber 17 is fed into the upper ends of tubes 11 by means of metering tubes 20 and from chamber 18 into the lower ends of tubes 11 by means of metering tubes 21.

Tubes 11 preferably contain suitable phase contacting means illustrated at 28, for instance, any of the packing materials referred to above. However, when tubes 11 are of small inner diameter, packing materials may not be required.

Liquid may be introduced into or withdrawn from tubes 11 at any point intermediate their ends, for instance, by a device 22 which is illustrated as comprising a conduit 23 communicating with tubes 11 through a plurality of metering orifices 24.

Chamber 17 is illustrated as being surrounded by a jacket 26 and chamber 18 is illustrated as being surrounded by a jacket 27.

Any suitable means (not shown) may be employed for introducing heat exchange fluid into and withdrawing the same from the various heat exchange chambers.

Tubes 11 may have a cross section of any desired geometrical configuration and within certain limits of any desired area. The cross section of tubes 11 is preferably limited to an area sufficiently small to prevent serious channeling after the contacting means, for instance, packing 28 has been arranged therein.

The preferred limiting cross sectional area for tubes 11 will be not only a function of the type of packing employed, since the small wire forms referred to above will as a rule permit the use of a larger cross section without an inordinate falling off of efficiency than raschig rings or jack chain, but also of the degree of uniformity of distribution of the packing in the tube. Since the tubes 11 may have sides which are straight or indented or of other surface configuration, the departure of a tube from a straight or continuous form will have its influence. For this reason a definite limit in cross sectional area which if exceeded in size will no longer demonstrate the substantial increase in efficiency which we have discovered results from a constriction of cross sectional area cannot be given, but may be readily determined, for instance, by testing the efficiency of single tubes of different sizes when packed with the packing which is to be employed.

It may be stated as a general rule that one should proceed with caution after exceeding a cross sectional area equivalent to that of a circular tube in the neighborhood of three inches in diameter, although with the proper selection of packing and a careful distribution in each tube, it is possible that larger cross sectional areas may be employed, while in other cases smaller cross sections may be required.

Therefore, the term "relatively small cross sectional area" when employed in this specification and in the claims is intended to mean a cross section which when taken in conjunction with the contacting means (if any) therein is sufficiently small to materially increase the contacting efficiency because of the constriction of its area.

In those cases in which it is desired to cause heat transfer through the tube walls, consideration should be given to the effect of cross-sectional area upon efficient heat transfer.

We have successfully employed metallic tubes of various relatively small cross-sectional areas, for instance tubes of circular cross-section and of $3/4$ inch, 1 inch, and of 1.75 inches in diameter, and have obtained both efficient heat transfer and efficient phase contact, although it appears that circular tubes up to about 4 inches in diameter might be employed successfully for heat transfer purposes.

Tower 10 is adapted for many different modes of operation. For certain of these modes, it may be greatly simplified in construction as will hereinafter appear.

Certain modes of operation are as follows:

(1) In this mode of operation solvent and oil are contacted by simple countercurrent flow. The heavier of the two liquids is introduced into the upper ends of tubes 11 through chamber 17 and metering tubes 20, and the lighter of the two liquids is introduced into the lower ends of tubes 11 through chamber 18 and metering tubes 21. Due to a difference in density the two liquids flow countercurrently to each other. These liquids are efficiently contacted without serious channeling in view (1) of the attenuated packing members and/or (2) of the small cross sectional area of tubes 11.

Two immiscible solutions are formed, the lighter of which collects in segregating chamber 15 and the heavier in segregating chamber 16 from which respective chambers they may be withdrawn as desired.

In this mode of operation the temperature may be constant in which case a single heat exchange chamber may be substituted for the chambers 14. Also, the various devices 22 may be omitted.

(2) In this mode of operation two immiscible or only partially miscible solvents are counterflowed through tubes 11 and the oil under treatment is introduced into tubes 11 at a suitable point or points intermediate the ends thereof, for instance, through a device 22 midway between the ends of tubes 11. All of the liquids will be prevented from serious channeling.

(3) In this mode of operation the oil is introduced into the tower at one end thereof, one solvent is introduced into the tower at the other end thereof, and one or more solvents are introduced at an intermediate point or points. The densities of the solvents are so chosen that they will flow countercurrently to the oil. The oil as it flows through the tower is first contacted by a mixture of all solvents, and progressively by one less solvent as the point of entry of that solvent is passed, and eventually is contacted by the single solvent which enters the tower at the end opposite that of the entry of said oil. All liquids are intimately contacted without serious channeling.

The solvents may be completely or partly miscible in the proportions in which they are introduced or may be completely immiscible.

(4) In this mode of operation reflux conditions are set up in the tower. As the oil and solvent flow countercurrently, the solvent capacity of the solvent is reduced in the direction of the solvent flow.

The concentration of dissolved oil at first increases in the direction of solvent flow until the solvent is substantially saturated with oil, the degree of saturation depending upon how nearly equilibrium conditions are approached, and then, as the solvent proceeds through the tower and although the solvent remains saturated with oil, the concentration of dissolved oil decreases due to the precipitation of oil from the solvent caused by the reduction in solvent capacity.

The precipitated materials, being of a density comparable to that of the feed oil, flow countercurrently to the solvent and back into the zone in which the solvent is unsaturated.

The precipitate in its flow countercurrently to the solvent is brought into intimate contact with the solvent. Thus, any components in the precipitate which are relatively more soluble in the solvent than components which are already in solution in the solvent, will go into solution and displace from solution such less soluble components.

Since these precipitated material flow into the solution zone, further quantities of relatively more soluble components thereof go back into solution. These components are carried back into the precipitation zone by the solvent.

As a result of the continuous repetition of this cycle, a much sharper separation of oil components is obtained and the quantity of components of the same composition finding their way into both the raffinate and extract phases, is substantially reduced.

Among the advantages over other processes is that all liquids are intimately contacted without serious channeling.

The solvent capacity of the solvent may be reduced in the direction of solvent flow (a) by introducing the oil into the tower at a temperature lower than that of the solvent, for instance, by employing heat exchange chambers 26 and 27; (b) by reducing the temperature along tubes 11 in the direction of solvent flow, for instance, by means of heat exchange chambers 14; (c) by introducing into the tubes 11 at one or more points, for instance, through the devices 22 a second solvent which is capable of forming a mixture with the first solvent of lower solvent capacity for the oil; (d) by reducing the solvent concentration in the direction of solvent flow, for instance, by withdrawing liquid from tubes 11 through any device 22, removing solvent and returning the residuum to the tubes 11 through another device 22 preferably adjacent the point of withdrawal; and (e) by a combination of any two or more of the foregoing, or otherwise.

If the temperature were reduced in the direction of oil flow, precipitation of solvent from the oil phase instead of oil from the solvent phase would result.

While the feed oil may be introduced into tower 10 so that it will flow through the precipitation zone, it may, in many instances, be desirable to introduce the feed oil into the solution zone only so that only the precipitate will flow through the precipitation zone. The former sub-mode of operation will be referred to as 4a and the latter as 4b.

In mode 4b the oil might be introduced into the tower through any of the devices 22 at the desired point or points.

Whether the feed oil flows through the precipitation zone as in mode 4a, or whether it flows only through the solution zone as in mode 4b, is of particular importance when side streams (to be referred to hereinafter) of precipitate are taken off.

(5) In this mode of operation tower 10 is used for fractional precipitation purposes. The solvent with its dissolved oil is caused to flow through tower 10 in a direction which is determined by the density of the precipitate. If the density of the precipitate is greater than that of the solution of solvent and oil, said solution is caused to flow upwardly through the tower. If the density of the precipitate is less than that of the solution, the solution is caused to flow downwardly through the tower. Thus, when oil is precipitated from solution, for instance, by any of the means set forth herein, it flows through the tower countercurrently to the solution and is scrubbed of its more soluble constituents before it is segregated from the solution at the end of the tower.

The scrubbing action is considerably greater when the solution is introduced into tower 10 in an unsaturated condition, since in this case a solution zone, as well as a precipitation zone, is set up in the tower. A saturated solution may be brought to an unsaturated condition by any suitable means, for instance, by heating or adding more solvent.

By running the solution serially through a plurality of towers in each of which precipitation takes place, either with or without the setting up of solution zones, fractional precipitation in stages is effected.

A part of the precipitate separated in any stage may be fed back into a preceding tower, for instance the next preceding, in a manner so that it will flow countercurrently to the solution therein. This will increase the scrubbing effect particularly if a part of the precipitate separated in each stage except, of course, the very first is fed back into the next preceding tower.

(6) In this mode of operation all of the liquids pass through the tower in the same direction but one travels at a greater linear rate than the other or others. Because the liquids travel through the tower at different velocities, there is a relative flow between the liquids which may be referred to as being countercurrent although, strictly speaking, it is not.

To accomplish the foregoing the liquids which are to form the phases may be introduced into tower 10 at the bottom thereof and caused to flow upwardly therethrough.

If the solvent and oil are mixed to form a solution or are homogeneously mixed mechanically, this mixture may be metered into tubes 11 either through chamber 16 or through chamber 18.

If the solvent and oil are in solution, a part of the oil may be caused to precipitate from solution in tubes 11 by any suitable means to cause the formation of the phases.

If the solvent and oil are not mixed prior to their introduction into tower 10, one may be metered into the tower through chamber 18 and the other through chamber 16. In the construction shown, it would be probably more satisfactory to meter the heavier liquid into the tower through chamber 16.

The liquid of lesser density travels up through tower 10 at a faster rate than the other liquid or liquids.

Because of the construction of tubes 11, the two phases are contacted without serious channeling.

The two phases may be separated by formation into layers which may take place in chamber 15, particularly if the construction is varied as indicated in dotted lines, by extending the tubes 11 into chamber 15 to deliver the phases to chamber 15 at about the level of the interface between the two phases.

The phases may be separately withdrawn from chamber 15 at different levels, for instance, by means of the outlets indicated in full and dotted lines.

When the phases flow up through the column, chamber 17 need not be employed.

On the other hand, the liquids which are to form the phases may be metered into column 10 through chamber 17 and/or chamber 15 in a manner similar to that previously described in connection with chambers 16 and 18.

In this case the heavier phase travels down through the column at a greater linear velocity than the lighter phase and is intimately mixed therewith. Layers of the two phases may be formed in chamber 16 and separately withdrawn through suitable outlets at different levels. The lower ends of tubes 11 may be extended as illustrated in dotted lines to a point approximately at the interface between the two layers.

Considering the foregoing in connection with mode of operation (1) above, it will be seen that to obtain relative movement between the two phases one phase may move through tower 10 in either direction without change in direction of the other phase, or, in fact, might remain stationary as long as the other phase is in motion.

Therefore, mode of operation (6) may be combined with mode of operation (1) or any other mode of operation herein described to cause the one phase to alternate in direction through the tower 10 should this be desired, or a contact analogous to that obtained in batch contacting may be obtained by holding one phase stationary.

While it may be preferred to have a phase that preferentially wets the packing travel faster than the other phase, the opposite might be resorted to.

(7) In this mode of operation, the flow of one phase with respect to the other phase, is at an angle less than 180° and greater than 0°.

This mode of operation may be combined with any of the previously described modes of operation.

A tower more suitably adapted to this mode of operation will be described hereinafter.

The desiderata in the operation of tower 10 are (1) that the lighter phase leaving any individual contacting unit shall be of the same composition as the lighter phase leaving any other contacting unit. (2) that the same shall apply with respect to the heavier phase and (3) that the two phases shall be homogeneously mixed in the contacting units.

In substantially approaching the foregoing it is simpler to make tubes 11 of the same cross section and length; to provide the same character of contacting means in each tube; to feed the oil under treatment at substantially the same rate into each tube; to feed solvent (or solvents) at substantially the same rate into each tube; when oil is precipitated for reflux purposes to cause the same amount of precipitation in each tube; and in fractional precipitation to feed the solution at substantially the same rate into each tube and cause the same amount of precipitation in each tube.

However, the individual contacting units may differ without departing from the spirit of the invention. Such differences may be as to construction, such as size, length, contacting means or otherwise.

For instance, the individual contacting units may vary as to construction but may be matched so that each will deliver lighter phase of substantially the same composition, and heavier phase of substantially the same composition when oil is fed at substantially the same rate to each, and solvent (or solvents) is fed at substantially the same rate to each.

On the other hand, the individual contacting units may be of the same and/or of different construction but may differ as to capacity. In this case, adjustments of the oil feed and/or of solvent feed may be made to cause the respective phases from any unit to be of substantially the same composition as the respective phases from any other unit.

The use of metering tubes 20 makes it possible to adjust the feeding rate of the heavier (or heaviest) liquid (either solvent or oil as the case may be) to any contacting unit by employing a metering tube for that unit of the desired capacity. Likewise, the use of metering tubes 21 makes it possible to adjust the rate of feed of the lighter (or lightest) liquid to any contacting unit by employing a metering tube for that unit of the desired capacity.

When a liquid (or liquids) is introduced into the column intermediate the ends thereof as in modes of operation (2) and (3) and possibly (4), (5), (6) and (7), the use of metering tubes 24 makes it possible to adjust the feeding rate of this liquid (or liquids) to any contacting unit by employing a metering tube for that unit of the desired capacity.

Thus, the desired balance may be obtained. The precision of this balance will, of course, depend upon the results desired and, therefore, may be rough or close according to requirements.

Other variations are possible, for instance, if tubes 11 are of the same cross section and are matched as to pressure drop, metering tubes 21 may be omitted, together with their supporting structure. Chambers 16 and 18 would thus become a single chamber into which the lighter (or lightest) liquid may be fed preferably adjacent its top and from which the heavier (or heaviest) solution may be withdrawn adjacent its bottom. The ascending lighter (or lightest) liquid, due to the uniformity of cross sectional area and pressure drop of tubes 11 will divide equally between the various tubes 11 or in other words is metered into the tubes.

However, in this variation differences in pressure drop may be compensated for, if necessary or desirable, by adjusting the quantity of heavier (and/or heaviest) liquid entering individual tubes 11 so that the respective solutions from any unit will be substantially the same as the respective solutions from any other unit.

If in this variation the tubes 11 are of different cross sectional area, the pressure drop through the individual tubes may be adjusted by varying the quantity of packing and/or the amount of heavier (and/or heaviest) liquid entering the individual tubes may be adjusted to obtain solutions from each individual contacting unit of the desired composition.

In modes of operation (4) and (5) the amount of precipitate produced in any individual contacting unit may also be regulated with or without other methods of regulation to obtain the desired balance.

It is thought that the two phases may in a sense be considered as a dispersed phase and a continuous phase in that one phase may pass in film and/or drop form through the other, the former being the dispersed phase and the latter the continuous phase. However, since in a homogeneous mechanical mixture both liquids are in a dispersed condition it may be that, at least in some cases, a continuous phase, strictly speaking, does not exist. It is conceivable, however, that in some cases it would be possible by control of the feed to maintain one phase continuous and the other dispersed. In such cases it would be preferred to disperse the phase which preferentially wets the packing, although the opposite may also be resorted to.

When the phase which preferentially wets the packing is dispersed this phase is conducted through each tube over and while wetting the packing medium and in being so conducted is maintained either entirely in film form or with a portion alternately in film and drop form. The latter also affords efficient contact because of a sort of kneading action caused by the drops recontacting the packing and re-spreading out into films only to be followed by the formation of more drops. This brings a large proportion of the liquid particles to the surface for contact with the other phase.

The special packing elements comprising small wire forms herein set forth are unusually efficient in that they afford a very high degree of surface area together with a very high degree of free space. These special packing elements are, therefore, superior to other packing of this type.

A construction in which the attenuated packing members are not enclosed in tubes is illustrated in Figures 3 and 4 in which tower 30 is shown as comprising a plurality of rods 31 carrying spaced protuberances 32, a shell 33 having a jacket 34, a feeding chamber 35, a segregating chamber 36, and a combined feeding and segregating chamber 37.

Rods 31 may be supported in tower 30 in any suitable manner, for instance, as illustrated.

Extending downwardly from feeding chamber 35 about each rod 31 is a metering tube 39, which is arranged so that the metered liquid will be deposited onto the rod.

Tubes 39 are of sufficient length to form with their supporting plate 40 and the upper end of shell 33 a segregating chamber 36.

The lower end of each rod 31 is illustrated as being surrounded by a segregating tube 41 which forms with the rod an annular space for the downward flow of liquid adhering to the rod. The lower end of each tube 41 is provided with a plurality of apertures 42 to permit said liquid to flow into chamber 37.

Each tube 41 is illustrated as extending beyond the upper end of chamber 37 and with its upper end surrounded by a tube 43 in such a manner as to afford an annular space 44 between the tubes for metering purposes.

The discs 32 on each rod 31 are illustrated as overlapping the discs 32 on adjacent rods 31.

In describing the operation of tower 30 it will be assumed that the heavier phase preferentially wets the rods 31 and discs 32.

The heavier liquid flows from chamber 35 down through metering tubes 39 onto the respective rods 31, continues on down through the tower while adhering to rods 31 and discs 32, collects in tubes 41, drains out through apertures 42 to form a layer in chamber 37, and is withdrawn at 46.

If any drops of this liquid leave any packing member, such drops almost immediately recontact another packing member and return to film form.

The lighter liquid enters chamber 37 at 47 and occupies the upper part of chamber 37. This liquid is metered up through the annular spaces 44 and thus is distributed laterally of the tower 30.

As the lighter phase flows up through the tower it intimately contacts the heavier phase.

The lighter solution collects in segregating chamber 36 and is withdrawn through outlet 48.

If the lighter phase wets the packing in preference to the heavier, tower 30 might be constructed up-side-down. The lighter liquid would then be metered onto rods 31 by tubes 39 and the heavier liquid would be metered laterally of the tower by annular spaces 44.

Other suitable means may be provided for metering the liquids and/or for separating the final phases. For instance, tubes 41 and 43 might be eliminated. The separation in chamber 37 would then be by simple layer formation, and the lighter liquid would be distributed laterally of the tower by virtue of its layer. This arrangement might be preferred, for instance, when the continuous phase preferentially wets the attenuated packing members.

It is, of course, possible to shape the protuberances 32 so as to substantially avoid the formation of drops, for instance, by making protuberances 32 frustums of cones with the small base pointing downstream of the wetting liquid flow or of similar shape, for instance, with the surface between the large and small base concave or convex. A concave surface would assist in directing the non-wetting liquid through a circuitous course without a material increase and possibly a decrease in pressure drop through tower 30. Protuberances 32 might also be shaped as rain-drops and arranged, for instance, with the nose pointing downstream of the wetting liquid flow and with the tail pointing upstream thereof, or vice versa.

For the purposes of clearness a limited number of attenuated packing members has been shown in the drawings with the volume of free space fairly large compared to the surface area of the packing. It is to be understood, however, that the attenuated packing members may be as densely grouped as desired and may be provided with any desired number of protuberances.

If one or more of the liquids should find a path of least resistance along the inner wall of shell 33, baffles might be attached to this wall to cause such liquid or liquids to flow back toward the attenuated packing members and to become redistributed.

A manner of metering liquid onto rods 31 intermediate the ends of tower 30 is illustrated in Figure 5 in which feeding section 50 may be considered as being interposed intermediate the ends of shell 33 of Figure 3. The corresponding parts of shell 33 are identified as 33a, of jacket 34 as 34a, of rods 31 as 31a, and of protuberances 32 as 32a.

Feeding section 50 comprises a chamber 51 formed by tube sheets 52 and 53 between which extend a plurality of imperforate tubes 54 and a plurality of perforate tubes 55.

Imperforate tubes 54 are free of any obstructions whereas a rod 31a passes down through each perforate tube 55.

Perforations 56 in tubes 55 comprise metering orifices through which liquid from chamber 51 may be metered onto rods 31a. This may be preferred when the liquid fed into the tower at the intermediate point preferentially wets the attenuated packing members.

However, rods 31a may pass through tubes 54 if desired, and orifices 56 may be employed for distributing said liquid from chamber 51 laterally of the tower, for instance, in case said liquid does not preferentially wet the attenuated packing members.

The metering of the various liquids into tower 30, whether at two or more points or whether onto the attenuated packing members or not, preferably follows as nearly as possible the principles above set forth in the discussion of tower 10.

While the metering onto the individual packing members of the liquid which preferentially wets the packing may be preferred, it is not an indispensable feature and other constructions may be employed, for instance, in case there should be no clearly defined preferential wetting.

While heat exchange jacket 34 has not been illustrated as being divided into a number of sections, such construction may be adopted.

Tower 30 may be used for any of the modes of operation heretofore described in connection with the description of tower 10.

In connection with the description of tower 10, it was pointed out that the packing 28 in tubes 11 may be adsorbent material.

The employment of adsorbent material as packing in the solvent treatment of a lubricating oil particularly when such treatment is for the purpose of extracting unsaturated, asphaltic, and/or naphthenic constituents, is especially useful since it assists the solvent in segregating these constituents from the other oil components.

Unsaturated, asphaltic and naphthenic constituents of an oil are preferentially adsorbed generally in the order named. In the solvent treatment of oil for the purpose of removing these constituents, such constituents are preferentially dissolved generally in the order named.

When adsorption and solvent extraction take place simultaneously in the same sphere of action, the separation is more rapid and/or more complete.

That portion of the oil which is adsorbed is apparently removed from the adsorbent material in whole or in part by the solvent. The degree of this removal depends somewhat upon the solvent employed.

In case the solvent does not maintain the adsorbent material in a revivified condition, the adsorbent material may be renewed either intermittently, for instance, by repacking tubes 11 of tower 10 as required, or intermittently or continuously by modifying the construction of the tower.

A tower adapted for either intermittent or continuous renewal of adsorbent material packing is illustrated in Figure 6 wherein tower 60 comprises a contacting section 61, a liquid feeding chamber 62, an adsorbent material feeding chamber 63, a light solution segregating chamber 64, a liquid feeding and segregating chamber 65 and an adsorbent material withdrawing means 66.

Section 61 may have a construction similar to the corresponding part of tower 10.

Metering tubes 68 extend from chamber 62 through chambers 63 and 64 and enter tubes 69 of section 61.

Adsorbent material 70 is fed into tubes 69 from chamber 63 through tubular filters 71 which are alined with tubes 69.

Adsorbent material 70 is withdrawn from tubes 69 through tubular filters 72 which extend from the lower ends of tubes 69 through chamber 65 and connect with individual units 73 of withdrawing means 66.

Each unit 73 is illustrated as comprising a casing 74 and a screw 75 housed therein.

Units 73 as shown extend into a container 76 in which the withdrawn adsorbent material and any seepage of heavier solution collect.

Screws 75 may be operated individually or in unison, for instance, by the means illustrated at 77 if desired.

In operation, the heavier liquid is fed from chamber 62 through metering tubes 68 into tubes 69.

The lighter liquid is fed into chamber 65 at 78, forms a layer therein above the layer of heavier solution, passes inwardly through the walls of filters 72, and ascends through tubes 69 wherein it contacts the descending heavier liquid.

The lighter solution thus formed ascends up into filters 71, passes outwardly through the walls of the filters and collects in chamber 64 from which it is withdrawn at 79.

The heavier solution descends into filters 72, passes outwardly through the walls of the filters, and forms a layer in the bottom of chamber 65 from which it is withdrawn at 80.

The adsorbent material may be fed into chamber 63 by any suitable means, for instance, the means illustrated at 81. The feeding is preferably in a manner so that the upper ends of filters 71 are kept covered.

In the form shown, the absorbent material descends by gravity through filters 71, tubes 69, and filters 72, as permitted by the revolution of screws 75 which discharge adsorbent material into container 76.

Since any seepage into container 76 will be of the heavier solution, this seepage may be withdrawn from container 76 as illustrated at 82 and combined with the heavier solution withdrawn at 80.

The adsorbent material may be removed from container 76 by any suitable means, for instance, by a screw or at intervals through a man-hole.

Any other suitable construction may be substituted for that shown in Figure 6, for instance, one which will cause the adsorbent material to ascend through filters 72, tubes 69, and filters 71, so that it may be withdrawn from chamber 63. Theoretically, this may be accomplished by reversing the rotation of screws 75 and supplying the lower ends thereof with the adsorbent material.

Tower 60 is capable of use in any of the modes of operation heretofore described in connection with tower 10, changes in construction being made when necessary following the principles above set forth.

For instance, tower 60 may be used in mode of operation (6). In this case the adsorbent material may be of any desired mesh. The ordinary percolation filters may be employed for this purpose if desired, but not with the same efficiency since in tower 10 serious channeling through the adsorbent material does not take place when elevated pressures are applied to the liquids.

The adsorbent material may be introduced into the tower in any other way, for instance, by forming a slurry of adsorbent material and one of the liquids to be fed into the tower, the slurry being withdrawn with one of the solutions formed depending upon the relative densities of the materials in the tower.

The invention, however, is not limited to this means of simultaneously contacting solvent and adsorbent material with oil since this may be accomplished by other suitable means, for instance, in batch operations or batch countercurrent operations, by methods comparable to those of contact filtration.

A form of the invention in which disengagement of phases and the formation of layers is effected intermediate the ends of the tower, is illustrated in Figure 7. Tower 90 is shown as being of a construction somewhat similar to tower 10 except that tubes 91 are in sections with the opposite ends 92 and 93 of each tube 91 projecting into a phase disengagement chamber. These chambers intermediate the ends of tower 90 are shown at 94.

To avoid a direct linear flow of ascending liquid or descending liquid or both through chambers 94, ends 92 or ends 93 (or both) of tubes 91 may be provided with caps 95. Caps 95 are arranged in a manner to avoid locking of the liquids against flow.

The heavier layer in any chamber 94 will collect about the ends 92 of tubes 91 and will overflow said ends. The upper edges 96 of ends 92 are preferably arranged in a horizontal plane so that the heavier layer will be metered into tubes 91, the quantity metered into any tube 91 being determined by the perimeter of the tube. For instance, if the perimeters of ends 96 are the same, the same amount of the heavier layer will be metered into each tube 91.

What has just been said applies equally to the feeding of the heavier liquid from chamber 98 into the ends 92 of the uppermost tubes 91.

The heavier liquid may be fed into chamber 98 as illustrated at 99.

The lighter liquid in any chamber 94 will accumulate about the downwardly projecting ends 93 of tubes 91 and will overflow said ends. The lower edges 100 of ends 93 are preferably arranged in a horizontal plane so that the lighter liquid will be metered into tubes 91, the quantity metered into any tube 91 being determined by the perimeter of the tube. If the perimeters of ends 100 are the same, the same amount of the lighter layer will be metered into each tube 91.

What has just been said applies equally to the feeding of the lighter liquid from chamber 101 into the ends 93 of the lowermost tubes 91.

The lighter liquid may be fed into chamber 101 as illustrated at 102.

The formation of layers in chambers 94 makes it possible to feed liquid into or withdraw liquid from either the oil phase or the solvent phase or both.

Means for feeding liquid into or withdrawing liquid from the lighter layer of any chamber 94 is illustrated at 104, and means for feeding liquid into or withdrawing liquid from the heavier layer of any chamber 94 is illustrated at 105.

It is, of course, understood that any number of chambers 94 may be employed, that is one or more.

In some instances, it may be desired to feed a liquid directly into tubes 91, for instance, this may be desired when such liquid is a precipitating solvent. For this purpose a device 22 as shown in Figures 1, 2 and 7 may be employed if desired.

At the ends of tower 90 the lighter solution is segregated in chamber 98 by layer formation and withdrawn at 106 and the heavier solution is segregated in chamber 101 by layer formation and withdrawn at 107.

Heat exchange with tubes 91 may be effected by any suitable means, if desired, for instance by means of the heat exchange chambers 109.

Tower 90 may be employed in any of the modes of operation heretofore listed in discussing tower 10.

Tower 90 is particularly adapted to modes of operation (4a), (4b), and (5) to obtain various fractions of oil varying as to quality if the solvent is selective as to molecular type or varying as to boiling point if the solvent is selective as to molecular size.

Under mode (4a) a part of the feed oil would come off with a side stream of precipitate, whereas in mode (4b) the side stream would be precipitate without feed oil.

Under mode (5) fractional precipitation in stages may be effected in a single tower.

Under mode (1) the various fractions would also vary as to quality or boiling point according to the solvent employed.

Under modes (2) and (3) similar effects would be produced.

Tower 90 might also be employed for mode (6).

It should be noted that a fraction taken off in a side stream may be of the poorer quality oil or of the better quality oil if the solvent is selective as to molecular type, or the fraction may be of the materials of lower boiling point or of the materials of higher boiling point if the solvent is selective as to molecular size. In other words, the side streams may be of the solvent phase, or of the oil phase, or both.

Any of the side streams withdrawn from tower 90 may be retreated with solvent, for instance, for stripping purposes. This may take place in a side tower such as illustrated at 108.

Disengagement of phases between the ends of a tower may be effected by other means, without departing from the spirit of the invention.

A tower in which the flow of one phase with respect to the other phase or phases is at an angle greater than 0° and less than 180° as called for in mode of operation (7) is illustrated in Figure 8.

In this figure, tower 140 has a construction which is very similar to that of tower 30 of Figures 3 and 4. The chief differences are the elimination of tubes 41 and 43 of Figure 3, the addition of one or more plates 141 which extend laterally of the tower 140 and divide said tower into a plurality of chambers 142, and the provision of manifolds 143 on opposite sides of chambers 142.

Plates 141 are provided with apertures 144 through which extend rods 31a of the attenuated packing members. Apertures 144 are sufficiently large to permit liquid flowing along rods 31a to flow therethrough but are preferably not so large as to permit a very substantial flow of the other phase therethrough. That is, apertures 144 are of a size and character to permit the flow of the vertically moving phase therethrough in preference to the laterally moving phase.

Branches 146 of the manifolds 143 may be provided with adjustable valve members 147 so that the flow of continuous phase through the individual branches 146 may be regulated.

The distribution of branches 146 on opposite sides of tower 140, whether the tower has a circular, square, rectangular or other geometrical cross section, is such that, as the liquid flows out of branches 146 and into a chamber 142 on one side and flows out of said chamber 142 and into branches 146 on the other side, such liquid is effectively distributed about the attenuated packing members.

In describing the operation of tower 140 it will be assumed that the phase which is of greater density preferentially wets the packing members. If the opposite were true, it would be merely necessary to construct tower 140 up-side-down.

The liquid which preferentially wets the packing is fed onto rods 31a through metering tubes 39a the same as in Figure 3.

This liquid flows along the attenuated packing members as it descends through tower 140, forms a layer at the bottom 149 thereof and is withdrawn at 150.

If the liquid which is to form the substantial part of the other or second phase is to progress countercurrently of the first phase as in modes of operation (1), (4), and (5), this liquid enters the lowermost chamber 142 of tower 140 through a manifold 143, flows transversely of the tower and out of said chamber 142 through the other manifold 143.

The latter manifold is connected to the next higher manifold 143 preferably on the same side of the tower. The second phase ascends with or without the aid of a pump and enters the next higher chamber 142 wherein it again flows transversely of the tower but preferably in a direction opposite from that in the first case, and leaves said next higher chamber 142 through the manifold 143 on the opposite side thereof.

Tower 140 may be provided with any number of chambers 142 and if said number is even and the chambers 142 are connected serially in the manner described the second phase will flow laterally of the tower 140 the same number of times in both directions. This tends to prevent the first phase from concentrating on one side of the tower.

However, the second phase need not necessarily flow transversely of tower 140 in opposite directions the same number of times and, in fact, may flow in one direction only should this be desired, or the manifolds may be so connected that the second phase is fed to each chamber 142 at the same time and flows transversely of the tower only once, should this be desired. In the latter case the second phase would progress neither countercurrently nor in the same direction as the first phase. In fact, the second phase may be held stationary during the contact in which case the contact may be compared to that which takes place in batch operations.

Should it be desired to have the second phase progress in the same direction as the first phase as in mode of operation (6), it would be merely necessary to reverse the direction of flow of the second phase. The flow might also alternate should this be desired for any reason.

In mode of operation (2) the first phase might be comprised chiefly of oil and the second phase (or phases) chiefly of the two partially miscible or immiscible solvents. The solvent of greater density would be fed into the uppermost chamber 142 and the heavier final phase withdrawn from the lowermost chamber 142 or otherwise, and the solvent of lesser density would be fed into the lowermost chamber 142 and the lighter final phase withdrawn from the uppermost chamber 142 or otherwise. The manifolds 143 would be specially connected to avoid locking of the two solvents against flow. The oil might be fed into the tower through chamber 35a if its density is such as to cause it to flow. Otherwise, the oil may be introduced at an intermediate point, for instance, by employing a construction such as shown in Figure 5.

All of the oil might or might not be dissolved in the solvent. The two solvents might flow in layer form countercurrently or in the same direction through one chamber 142 only, if desired.

In mode of operation (3) the first phase might also be comprised chiefly of oil.

Protuberances 32a on rods 31a may have any suitable configuration and have been illustrated as being frustums of double cones. In this tower, as well as in tower 30, the protuberances 32 or 32a may have any other suitable shape, for instance, that of a rain-drop with the nose pointing upstream and the tail pointing downstream of the continuous phase flow. They may, however, be reversed.

Should the lateral flow of the second phase and/or the precipitation of materials from the second phase cause any substantial quantity of the first phase to become permanently separated from the attenuated packing members in any chamber 142, this separated portion of the first phase may be metered back onto rods 31a by providing apertures 144 with risers 152 and by arranging the upper edges 153 of the risers 152 of any plate 141 in a horizontal plane. Otherwise, the risers 152 may be omitted if desired.

Should the second phase preferentially wet the packing, it may be made to flow either vertically or transversely of the tower, the first phase flowing in the other of the two directions.

The operation of tower 140 would be somewhat similar even though there were no well defined preferential wetting, care being taken to permit the desired separation of phases in chambers 142.

A plurality of any of the foregoing towers or a combination of such towers may be connected together in a manner so as to adapt such arrangement for a large number of the foregoing modes of operation.

This is illustrated in Figure 9 wherein towers 161, 162, 163, and 164 are illustrated as being constructed similarly to tower 10.

Upper outlet 165 of tower 161 is connected to lower inlet 166 of tower 162 through line 167 in which is shown a heat exchanger 168 and a pump 169.

Upper outlet 171 of tower 162 is connected to lower inlet 172 of tower 163 through line 173 in which is shown a heat exchanger 174 and pump 175.

Upper outlet 177 of tower 163 is connected to lower inlet 178 of tower 164 through line 179 in which is shown a heat exchanger 180 and pump 181.

Upper outlet 183 may lead to a receiver or other point.

Lower outlet 185 of tower 164 is connected to upper inlet 186 of tower 163 through line 187 in which is shown a pump 188 and heat exchanger 189.

Lower outlet 191 of tower 163 is connected to upper inlet 192 of tower 162 through line 193 in which is shown a pump 194 and heat exchanger 195.

Lower outlet 197 of tower 162 is connected to upper inlet 198 of tower 161 through line 199 in which is shown a pump 200 and heat exchanger 201.

Lower outlet 203 of tower 161 may lead to a receiver or other source.

Tower 164 is provided with an upper inlet 204 and tower 161 is provided with a lower inlet 205.

In mode of operation (1) the lighter phase enters the system at 205, flows up through tower 161, down through line 167, up through tower 162, down through line 173, up through tower 163, down through line 179, up through tower 164, and out of the system at 183.

The heavier phase enters the system at 204, flows down through tower 164, up through line 187, down through tower 163, up through line 193, down through tower 162, up through line 199, down through tower 161, and out of the system at 203.

If desired side streams of the lighter phase might be taken off at 210, 211 and/or 212 and/or side streams of the heavier phase might be taken off at 207, 208 and/or 209.

In the mode of operation (4a) the flow is the same except that the solvent capacity of the solvent is reduced in the direction of solvent flow. For instance, if the solvent enters at 205, tower 161 may be operated at the highest temperature, tower 162 at the next highest temperature, tower 163 at the next highest temperature and tower 164 at the lowest temperature; or, the temperature of the lighter phase may be gradually reduced in succession by heat exchangers 168, 174, and 180; or both. The temperature might be reduced in any other manner, for instance, along the towers themselves.

A precipitating solvent might be introduced into towers 164, 163, 162 and/or 161 at any desired point with or without the reduction of temperature previously referred to.

Precipitation of oil might be effected by other means, for instance, by evaporation or other removal of solvent in place of or in addition to reduction in temperature and/or addition of another solvent.

If the solvent were introduced at 204 the temperature would, of course, be progressively reduced in the opposite direction through the system from that just described.

If desired side streams of the lighter phase might be taken off at 210, 211 and/or 212 and/or side streams of the heavier phase might be taken off at 207, 208 and/or 209.

In mode of operation (4b) if the solvent were introduced into the system at 205, and the oil at 198, side streams of precipitated oil might be taken off at 207, 208 and/or 209.

If the oil were introduced at 192, side streams of precipitated oil might be taken off at 208 and/or 209 or, if the oil were introduced at 186, a side stream of percipitated oil might be taken off at 209.

If the solvent were introduced into the system at 204, the oil might enter the system at 178, 172 and/or 166 and side streams of precipitated oil might be taken off at outlets 210, 211 and/or 212, depending upon the entry of oil.

Side streams of either phase, of course, might be taken off at other points if desired.

It is to be noted, however, that no sidestream need be taken off.

It will be seen that modes of operation (4a) and (4b) might be combined.

In mode of operation (5) the solution may enter at 205 or at 204 depending upon the relative density of the precipitate.

Assuming that the solution enters at 205, the first stage precipitate will be taken off at 203.

The solution will enter column 162 at 166 either in the saturated condition in which it leaves column 161 or in an unsaturated condition by virtue of the addition of heat, for instance, at heat exchanger 168 or of the addition of solvent, for instance, at 166.

The second stage precipitate will be taken off at 207.

In a similar manner the solution flows through columns 163 and 164, and the third and fourth stage precipitates are taken off at 208 and 209 respectively.

If only a part of the precipitate is withdrawn at each of 207, 208, and 209 we have the condition of a part of the precipitate in each stage except the very first, being fed back into the next preceding tower. The first stage precipitate may, of course, comprise merely scrubbed precipitate fed back from the second stage, in which case tower 161 would not be operated to directly cause precipitation.

However, the feeding back of precipitate from any stage may be operated independently of any other stage.

From the foregoing description the operation of the system when the solution enters at 204 will be obvious to persons skilled in the art.

In mode of operation (6) the two liquids merely progress through the system entering at 205 or at 204 depending upon which phase is to travel the faster.

In mode of operation (2) one solvent enters at 205, the other at 204, and the oil may enter at 198, 166, 192, 172, 186, 178 and/or any other intermediate point or points.

In mode of operation (3) the oil may enter at 205 or at 204 depending upon its relative density with respect to the solvents, and the solvents may enter at any desired number of points along the flow of the oil.

The term solvent as used herein includes a mixture of solvents when used in place of a single solvent. Also the term solvent includes any compound or mixture of compounds whether in the liquid, solid or vapor phase at normal temperatures and pressures.

The term "mineral oil" as used herein includes a mixture of mineral oil fractions or a mixture containing a mineral oil fraction, for instance highly viscous lubricating oil thinned with solvent to increase fluidity.

The terms "substantially uniform", "substantially uniformly", "substantially equal", "substantially equally", "substantially identical", and "substantially identically" when used herein include uniform, uniformly, equal, equally, identical, and identically respectively.

It is, of course, understood that the temperature at some time during the treatment will be such as to permit the formation of two phases and/or the separation of said phases except, of course, should the modes of operation be employed to form a single solution of all of the liquids.

It will also be understood that the contacting sections of any of the towers described herein may have any desired height. In choosing such height consideration will, of course, be given to the number of theoretically perfect batch contacts desired in the particular contacting section. The efficiency of the packing will have its influence upon height since for the same results a more efficient packing will require a lesser height than a less efficient packing.

In one setup similar to that of Figure 1 having a contacting section equivalent to about forty feet with jack chain as packing in the tubes, between eight and twelve theoretically perfect batch contacts were obtained, depending upon the mode of operation adopted. The height per theoretically perfect batch contact might have been considerably reduced by substituting the small wire forms referred to above in place of jack chain.

It will be seen that a fundamental characteristic of similarity between the several modes of operation and towers described herein is found in the formation and maintenance of a plurality of separate streams of at least one phase, this plurality of separate streams of one phase being brought into intimate contact with the other phase in a manner affording a high rate of lateral diffusion between the phases with a low rate of longitudinal diffusion in the individual phases.

Either phase may comprise any liquid or mixture of liquids whether in the solid, liquid, or vapor phase at normal temperatures and pressures, the treatment of mineral oil and more particularly lubricating oil with solvents being set forth herein as a specific example.

A further fundamental characteristic of similarity resides in the solvent treatment of mineral oils and the various steps pertaining thereto.

The various towers, modes of operation, and steps herein particularly described represent specific examples of applying the invention which is intended to be limited only as required by the prior art. Therefore, changes, omissions, additions, substitutions and/or modifications might be made without departing from the spirit of the invention.

For convenience in description, the terms "vertically" and "uprightly" as used in the specification and in the claims in describing the positioning of the attenuated packing members is intended to include not only a positioning wherein the packing members are perpendicular to the horizon but also a positioning wherein they are sufficiently so to function for the purposes set forth herein.

Also for convenience in description the term "rod" as used in the specification and claims in describing the structure of certain attenuated packing members is used broadly and includes any other structure capable of a similar function whether it be solid or hollow, imperforate or perforate, unitary or articulated, or a connected series of links or rings such as jack chain or otherwise.

Reference is made to certain of applicants' copending applications as follows: Serial No. 688,416 filed September 6, 1933, Serial No. 699,050 filed November 21, 1933, Serial No. 697,344 filed November 9, 1933, Serial No. 697,858 filed November 13, 1933, Serial No. 697,990 filed November 14, 1933 and Serial No. 735,026 filed July 13, 1934, which show several species and of one or more of which this application might be considered as a continuation in part.

We claim:

1. In a process for contacting liquid phases such as in the treatment of mineral oils wherein one liquid phase is caused to move through a zone of contact relative to another liquid phase by virtue of a difference in density, the step of maintaining at least one phase in a widely distributed form by causing said relative movement between said phases to take place in the presence of a group of attenuated packing members arranged in the zone of contact side by side and longitudinally of the flow of at least one phase with each packing member of sufficient length to extend throughout at least a substantial portion of said zone of contact.

2. In a process for contacting liquid phases such as in the treatment of mineral oils wherein one liquid phase is caused to move through a zone of contact relative to another liquid phase by virtue of a difference in density, the step of maintaining at least one phase in a widely distributed form by causing said relative movement between said phases to take place about a group of attenuated packing members arranged in the zone of contact side by side and longitudinally of the flow of said phases with each packing member of sufficient length to extend throughout at least a substantial portion of said zone of contact.

3. A process for the countercurrent contact of liquid phases such as in the treatment of mineral oils, comprising maintaining at least one phase in a widely distributed form by causing a treating phase to move through a zone of contact countercurrently to a phase under treatment by virtue of a difference in density of said phases, said countercurrent movement between said phases taking place about a group of attenuated packing members arranged in the zone of contact side by side and longitudinally of the flow of said phases with each packing member of sufficient length to extend throughout at least a substantial portion of said zone of contact.

4. In a process for contacting liquid phases such as in the treatment of mineral oils wherein one liquid phase is caused to move through the zone of contact relative to another liquid phase by virtue of a difference in density, the step of maintaining at least one phase in a widely distributed form by causing said relative movement between said phases to take place about a group of individually unencased attenuated packing members arranged in the zone of contact side by side and longitudinally of the flow of at least one phase with each packing member of sufficient length to extend throughout at least a substantial portion of said zone of contact.

5. In a process for contacting liquid phases such as in the solvent treatment of petroleum oil fractions, the step of flowing said liquid phases relative to each other through a phase contacting zone in which at least one of said liquid phases for at least the most part is maintained throughout said phase contacting zone in a plurality of separate relatively small streams.

6. In a process involving the relative flow of liquid phases by virtue of a difference in density for the purposes of contact such as in the treatment of mineral oils, the steps of causing one of said liquid phases to flow through the common path of the relative flow in a widely distributed form by conducting said liquid phase through over a plurality of packing members each of which has a relatively long and generally narrow shape, said packing members being wetted by said liquid phase.

7. In a process involving the counterflow of a mineral oil and a solvent by virtue of a difference in density for the purposes of contact, the steps of causing at least one of said liquids to flow through the common path of the counterflow in a widely distributed form by conducting said liquid through said common path in substantially equal amounts over a plurality of packing members each of which has a relatively long and generally narrow shape, said packing members being wetted by said liquid.

8. In a process involving the counterflow of a mineral oil and a solvent by virtue of a difference in density for the purpose of contact, the steps of causing one of said liquids to flow through the common path of the counterflow in a substantially uniformly distributed film and drop form by conducting said liquid through said common path in substantially equal amounts over a plurality of elongated packing members at least for the most part of relatively small average cross-sectional area, said packing members being wetted by said liquid, and shaping said packing members in a manner so that at least a part of said liquid will become detached in drops from said packing members and will recontact said packing members in the course of its flow.

9. In a process for contacting liquid phases such as in the solvent treatment of petroleum oil fractions, the step of countercurrently flowing said liquid phases through a phase contacting zone in which each liquid phase is maintained throughout said phase contacting zone in a plurality of separate relatively small streams.

10. In a process for contacting liquid phases such as in the solvent treatment of mineral oils, the steps of countercurrently flowing said liquid phases through a phase contacting zone, maintaining each liquid phase while in said phase contacting zone in a plurality of separate relatively small streams, and contacting each stream of each liquid phase with a separate stream of another liquid phase in a segregated phase contacting course in which each stream is caused to contact its associated stream over a relatively large area compared to its volume.

11. In a process involving the counterflow of a mineral oil and a solvent by virtue of a difference in density for the purposes of contact, the steps of causing at least one of said liquids to flow through the common path of the counterflow in a widely distributed form by conducting said liquid through said common path in substantially equal amounts over a plurality of separate packing members arranged in relatively long and generally narrow shapes, said packing members being wetted by said liquid, and separately encasing each of said packing members to confine said counterflow to said packing members.

12. A process for counterflowing liquid phases by virtue of a difference in density for the purposes of contact such as in the solvent treatment of petroleum oil fractions, comprising dividing each liquid phase into a plurality of streams, counterflowing said streams so that each stream of each liquid phase contacts one stream of each other liquid phase in an elongated phase contacting path which is segregated from all of the other streams, and substantially uniformly distributing the counterflowing streams across the cross section of each phase contacting path by confining the average cross section of each phase contacting path to a relatively small area.

13. In a process for contacting liquid phases such as in the solvent treatment of mineral oils, the steps of countercurrently flowing said liquid phases through a phase contacting zone, maintaining each liquid phase while in said phase contacting zone in a plurality of separate relatively small streams, contacting each stream of each liquid phase with a separate stream of each other liquid phase in a segregated phase contacting course in which each stream is caused to contact each associated stream over a relatively large area compared to its volume, and maintaining the proportions of said phases at least substantially identical in said segregated phase contacting courses.

14. A process for counterflowing a mineral oil and a solvent by virtue of a difference in density for the purposes of contact, comprising dividing each liquid into a plurality of streams of substantially equal size, counterflowing said streams so that each stream of each liquid contacts one stream of the other liquid in a path which is segregated from all of the other streams, substantially uniformly distributing the counterflowing streams across the cross-section of each path by confining the average cross-section of each path to a relatively small area, and by substantially uniformly distributing a packing medium in each path, obtaining substantially uniform conditions in each path by having each path of substantially the same dimensions and packed in substantially the same manner, and recombining the streams of each liquid after leaving said paths.

15. In a process for contacting liquid phases such as in the solvent treatment of mineral oils, the steps of countercurrently flowing said liquid phases through a phase contacting zone, maintaining each liquid phase while in said phase contacting zone in a plurality of separate relatively small streams, contacting each stream of each liquid phase with a separate stream of each other liquid phase in a segregated phase contacting course in which each stream is caused to contact each associated stream over a relatively large area compared to its volume, maintaining the proportions of said phases at least substantially identical in said segregated phase contacting courses, and maintaining said segregated phase contacting courses under at least substantially identical temperature conditions.

16. A process for contacting liquid phases such as in the solvent treatment of mineral oils wherein one liquid phase is a solvent for another liquid phase, comprising causing said phases to move countercurrently to each other through a zone of contact by virtue of a difference in density of said phases, maintaining at least one phase in a widely distributed form by causing said countercurrent movement between said phases to take place in the presence of a group of attenuated packing members arranged in the zone of contact side by side and longitudinally of the flow of said phases with each packing member of sufficient length to extend throughout at least a substantial portion of said zone of contact, and decreasing the solvent capacity of said solvent phase in the direction of its flow to eventually cause precipitation of at least a part of said other liquid phase from said solvent phase to set up reflux conditions in said zone of contact.

17. A process as claimed in claim 16 wherein the phase under treatment is fed into the zone of contact at the end thereof.

18. A process as claimed in claim 16 wherein the phase under treatment is fed into the zone of contact at an intermediate point, and wherein the solvent capacity of the solvent is decreased in the direction of solvent flow at least chiefly beyond said point.

19. In a process for treating a mineral oil with a solvent, the steps of countercurrently flowing said oil and solvent through a column in which at least one of said liquids is maintained throughout the zone of contact at least for the most part in a plurality of separate streams of substantially equal size, and precipitating and refluxing through the solution zone a part of the oil thus dissolved in said solvent.

20. In a process for treating a mineral oil with a solvent, the steps of countercurrently flowing said oil and solvent through a phase contacting zone in which each liquid is maintained in a plurality of separate relatively small streams with each stream of one liquid contacting a separate stream of the other liquid in a segregated path, and precipitating a part of the dissolved oil in said paths to set up reflux conditions in said paths.

21. In a process for treating a mineral oil with a solvent, the steps of countercurrently flowing said oil and solvent through a column in which each liquid is maintained in a plurality of relatively small streams with each stream of one liquid contacting a separate stream of the other liquid in a segregated path, feeding the solvent and oil phases into said paths at substantially the same ratio one to the other, precipitating in each segregated path a part of the dissolved oil, and refluxing into the solution zone of each segregated path the oil precipitated in said segregated path.

22. In a process for precipitating a material such as mineral oil from solution in a selective solvent, the steps of causing the solvent and precipitate to flow countercurrently to each other through a column while maintaining at least one of said liquids throughout the zone of contact at least for the most part in film form and in separate streams.

23. In a process for precipitating a material such as mineral oil from solution in a selective solvent, the steps of causing said solution and precipitate to flow countercurrently through a column while maintaining each liquid throughout the zone of contact in a plurality of separate streams, contacting each stream of each liquid with a separate stream of the other liquid in a separate phase contacting path in said zone of contact, and maintaining the proportion of precipitate to solution at least substantially identical in each path.

24. In a process for precipitating less soluble components of a material such as mineral oil from a solution thereof in a selective solvent, the steps of flowing said solution through a column having a plurality of phase contacting paths of relatively small cross sectional area, maintaining said solution in an unsaturated condition in a zone in each path, bringing said solution to a super-saturated condition in a zone in each path downstream of solvent flow from said first mentioned zone to cause precipitation in said path, flowing the precipitate in each path countercurrently to the solution passing therethrough and into the zone of solvent unsaturation in said path, and controlling the precipitation in each path so that the proportion of precipitate to solution will be at least substantially the same in each path.

MERRELL R. FENSKE.
WILBERT B. McCLUER.